(12) United States Patent
Robinson et al.

(10) Patent No.: US 8,533,721 B2
(45) Date of Patent: Sep. 10, 2013

(54) METHOD AND SYSTEM OF SCHEDULING OUT-OF-ORDER OPERATIONS WITHOUT THE REQUIREMENT TO EXECUTE COMPARE, READY AND PICK LOGIC IN A SINGLE CYCLE

(75) Inventors: Stephen J. Robinson, Austin, TX (US); Deepak Limaye, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 12/748,203

(22) Filed: Mar. 26, 2010

(65) Prior Publication Data

US 2011/0239218 A1    Sep. 29, 2011

(51) Int. Cl.
*G06F 9/46* (2006.01)
*G06F 9/40* (2006.01)
*G06F 7/38* (2006.01)

(52) U.S. Cl.
USPC ........... 718/103; 718/102; 718/107; 712/220; 712/215; 712/214; 712/237

(58) Field of Classification Search
None
See application file for complete search history.

(56) References Cited

U.S. PATENT DOCUMENTS

| | | | | |
|---|---|---|---|---|
| 7,725,690 | B2 * | 5/2010 | Shen et al. | 712/220 |
| 7,890,734 | B2 * | 2/2011 | Golla | 712/215 |
| 2011/0029978 | A1 * | 2/2011 | Smolens et al. | 718/103 |

OTHER PUBLICATIONS

Stark et al; On pipelining Dynamic Instruction Scheduling Logic, Proceedings of the 33rd annual ACM/IEEE, 2000.*
Brown et al; Select-free instruction scheduling logic, MICRO-34. Proceedings. 34th, 2001.*

* cited by examiner

*Primary Examiner* — Meng An
*Assistant Examiner* — Bing Zhao
(74) *Attorney, Agent, or Firm* — Blakely, Sokoloff, Taylor & Zafman LLP

(57) ABSTRACT

A method and system to schedule out of order operations without the requirement to execute compare, ready and pick logic in a single cycle. A lazy out-of-order scheduler splits each scheduling loop into two consecutive cycles. The scheduling loop includes a compare stage, a ready stage and a pick stage. The compare stage and the ready stage are executed in a first of the two consecutive cycles and the pick stage is executed in a second of the two consecutive cycles. By splitting each scheduling loop into two consecutive cycles, selecting the oldest operation by default and checking the readiness of the oldest operation, it relieves the system of timing requirements and avoids the need for power hungry logic. Every execution of an operation does not appear as one extra cycle longer and the lazy out-of-order scheduler retains most of the performance of a full out-of-order scheduler.

10 Claims, 4 Drawing Sheets

100

| 210 Instr. 1: | load esi, [eax] | # 3 cycles load instr. |
| 220 Instr. 2: | add edi, esi | # Dependent on instr. 1 |
| 230 Instr. 3: | add eax, ebx | # Independent instr. |
| 240 Instr. 4: | add edx, eax | # Dependent on instr. 3 |
| 250 Instr. 5: | add ecx, edx | # Dependent on instr. 4 |

200

| Instr. No. / Clk. cycle | 1 | 2 | 3 | 4 | 5 | 6 | 7 | 8 |
|---|---|---|---|---|---|---|---|---|
| 1 | SCH | AGU | DC1 | DC2 | | | | |
| 2 | | | | SCH | EX1 | | | |
| 3 | | | | | SCH | EX1 | | |
| 4 | | | | | | SCH | EX1 | |
| 5 | | | | | | | SCH | EX1 |

300

US 8,533,721 B2

METHOD AND SYSTEM OF SCHEDULING OUT-OF-ORDER OPERATIONS WITHOUT THE REQUIREMENT TO EXECUTE COMPARE, READY AND PICK LOGIC IN A SINGLE CYCLE

FIELD OF THE INVENTION

This invention relates to a scheduler, and more specifically but not exclusively, to a method and system of lazy out-of-order scheduling.

BACKGROUND DESCRIPTION

In microprocessors, out-of-order scheduling is an important mechanism to improve the performance of the microprocessors. Typically, hardware logic in the microprocessors finds independent operations within a processing window that can be done in parallel. The out-of-order operations are executed in parallel to increase the overall rate of executing instructions.

FIG. 1 illustrates a block diagram 100 of a prior art out-of-order scheduler 105. The prior art out-of-order scheduler 105 has a multiplexer (Mux) 110, a flip-flop 115, a compare logic 120, a ready logic 130, and a pick logic 140. The flip-flop 115 shows that the compare logic 120, ready logic 130, and the pick logic 140 are required to be completed within a single cycle. Once an operation has been selected by the pick logic 140, the operation is sent to the opcode/data module 150 via the multiplexer 110.

The opcode/data module 150 sends in parallel, the operation to the arithmetic logic unit (ALU) control decode module 160 for decoding of the operation and the data of the operation to the ALU control decode module 160 via the bypass module 170 and the flip-flop 175. When the decoding is completed, the operation is sent to the ALU module 180 for execution.

FIG. 2 illustrates a sequence 210 of prior art operations. Instruction 1 210 is a load instruction that loads the contents from the memory of the address found in the register eax into the register esi. The instructions 2-5 220, 230, 240 and 250 are addition instructions.

FIG. 3A illustrates a timing sequence 300 of a prior art in-order scheduler that schedules the sequence 210 of prior art operations sequentially. The instruction 1 210 is scheduled (SCH) in cycle 1 and it requires 3 cycles to complete. In cycle 2, the Address Generation Unit (AGU) stage creates the address that is needed to lookup a data cache based on the input source of instruction 1 210. The data cache is assumed to require cycles 3 and 4 to be accessed. The instruction 2 220 is scheduled in cycle 4 and goes through the execution stage 1 (EX1) in cycle 5. Similarly, instructions 3-5 230, 240, and 250 are executed sequentially after instruction 2 220.

FIG. 3B illustrates a timing sequence 350 of a prior art out-of-order scheduler 105. The instruction 3 230 is independent of the other instructions and is scheduled in cycle 1 in parallel with instruction 1 210. Instructions 4-5 240, and 250 are executed after the instruction 3 230. Each scheduling involves executing the compare, ready and pick logic. The prior art in-order scheduler and the prior art out-of-order scheduler 105 complete the scheduling of the sequence 210 of prior art operations in eight and five cycles respectively.

Although the prior art out-of-order scheduler 105 is faster than the prior art in-order scheduler, it requires the execution of the compare, ready and pick logic within a single cycle. This process is often timing critical and it limits the size of the scheduler and/or the frequency of the logic.

BRIEF DESCRIPTION OF THE DRAWINGS

The features and advantages of embodiments of the invention will become apparent from the following detailed description of the subject matter in which.

DETAILED DESCRIPTION

Figures 1, 2, 3A:
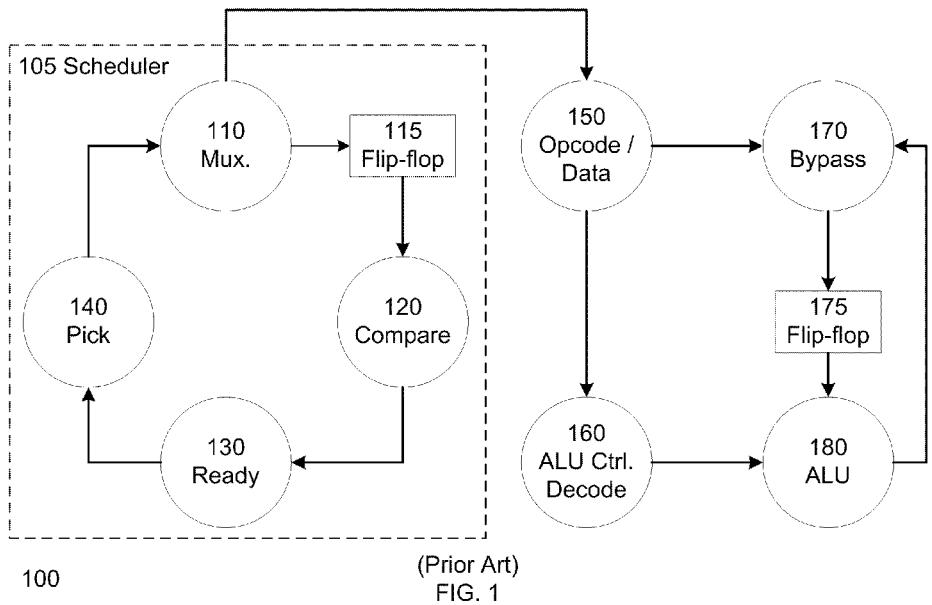
FIG. 1 illustrates a block diagram of a prior art out-of-order scheduler.
FIG. 2 illustrates a sequence of prior art operations.
FIG. 3A illustrates a timing sequence of a prior art in-order scheduler.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system of scheduling out of order operations without the requirement to execute compare, ready and pick logic in a single cycle. In one embodiment of the invention, a lazy out-of-order (OOO) scheduler splits each scheduling loop into two consecutive cycles. The scheduling loop includes a compare stage, a ready stage and a pick stage. The compare stage and the ready stage are executed in a first of the two consecutive cycles and the pick stage is executed in a second of the two consecutive cycles.

In one embodiment of the invention, the lazy OOO scheduler achieves almost the same performance as the prior art OOO scheduler 105 that executes compare, ready and pick logic in a single cycle. By splitting each scheduling loop into two consecutive cycles, it relieves the system of timing requirements and allows a larger scheduler. Similarly, the system with a lazy out-of-order scheduler is able to execute at higher frequencies and it avoids the need for power hungry logic to meet timing requirements. The cycle of the system includes, but is not limited to, a machine, a clock cycle, a division of time, a window, and any other measurement unit of execution. The operations of the system include, but are not limited to, functions, instructions, processing tasks and the like.

Figures 3B, 4:
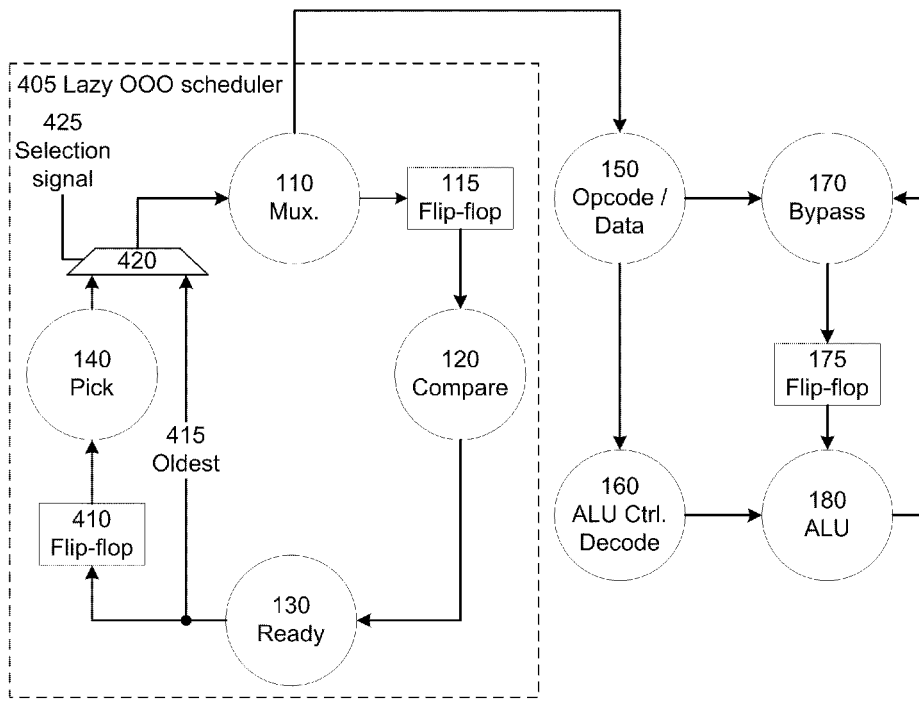
FIG. 3B illustrates a timing sequence of a prior art out-of-order scheduler.
FIG. 4 illustrates a block diagram of a lazy out-of-order scheduler in accordance with one embodiment of the invention.

FIG. 4 illustrates a block diagram 400 of a lazy OOO scheduler 405 in accordance with one embodiment of the invention. The lazy OOO scheduler 405 has a multiplexer (Mux) 110, a compare logic 120, a ready logic 130, a pick logic 140, flip-flops 115 and 410, and a multiplexer 420. For clarity of illustration, the lazy OOO scheduler 405 is assumed to have ten operations for scheduling and the first of the ten operations is assumed to be dispatched for execution via the multiplexer 110 at cycle one. The multiplexer 110 sends the first operation to the opcode/data module 150. The workings of the opcode/data module 150, ALU control decode module 160, bypass module 170, ALU 180 and the flip-flop 175 are described in FIG. 1 and shall not be repeated herein.

The compare logic 120 compares the input sources or operands of the remaining non-dispatched nine operations with the output destination of the first operation. If the output destination matches one of the input sources of the remaining non-dispatched nine operations, the ready logic 130 indicates or marks the matched input source as ready, i.e., the producer of the matched input source has been dispatched.

The ready logic 130 indicates or marks each of the remaining non-dispatched nine operations as ready when all the input sources of each operation are marked as ready. The ready indication shows that the operations marked as ready can be dispatched for execution at cycle two. The execution of the compare logic 120 and the ready logic 130 are performed immediately after the first operation has been dispatched and the execution is completed within a single cycle in one embodiment of the invention. The flip-flop 115 illustrates the requirement that the execution of the compare logic 120 and the ready logic 130 is a single cycle.

The pick logic 140 is executed at the start of cycle two as illustrated by the flip-flop 410. The pick logic 140 selects an operation from all the ready operations for each dispatch port of the system. The multiplexer 420 selects between the selected instruction(s) from the pick logic 140 and the oldest operation 415 from the ready logic 130. In one embodiment of the invention, each of the ten instructions has a time stamp and the oldest operation 415 is determined from the time stamp.

The pick logic 140 is allowed a full cycle before the selection of operations for execution is done. This removes the timing pressure on the lazy OOO scheduler 405. In one embodiment of the invention, the selection signal 425 of the multiplexer 420 is set to select the oldest operation 415 by default. If there are more than one dispatch port in the system, each of the oldest operation per dispatch port in the system is selected by default.

When one or more operations are marked ready by the ready logic 130, the selection signal 425 switches the multiplexer 420 to select from the pick logic 140. When there are no operations are marked ready by the ready logic 130, the default oldest operation 415 is selected, and its readiness based on non-stale or current information is checked. In one embodiment of the invention, the readiness of the oldest operation 415 is updated in parallel during the execution of the ready logic 130.

If the oldest operation 415 is determined to be ready, i.e., all input source(s) are ready, the oldest operation 415 is dispatched for execution via the multiplexer 110. The selection of the multiplexer 420 to select between the oldest operation 415 and the other ready operations from the pick logic 140 is performed independently on the oldest operation 415 being marked ready. This allows the lazy OOO scheduler 405 to achieve a similar performance to the prior art OOO scheduler 105.

Without the default selection of the oldest operation 415, every execution of an operation will appear as one extra cycle longer and it includes simple ALU operations that take a single cycle. Using the embodiments of the invention, the lazy OOO scheduler 405 does not completely negate any advantages of OOO scheduling and is able to achieve better performance than an in-order scheduler.

The selection of the multiplexer 420 based on the oldest operation 415 is not meant to be limiting. In other embodiments of the invention, a different parameter can be used to determine the priority of the scheduling of the operations. The parameter includes, but is not limited to, resource requirement, timing requirement, and the like. The pick logic 140 uses the parameter as a basis to select among the ready instructions in one embodiment of the invention. One of ordinary skill in the relevant art will readily appreciate how to apply the workings of the invention to a different parameter.

In one embodiment of the invention, the lazy OOO scheduler 405 allows a trivial dynamic switch between in-order scheduling and OOO scheduling using the selection signal 425. The selection signal 415 is set by default to select the operations from the pick logic 140 when in-order scheduling is desired. This feature is beneficial tool for power savings.

Figures 5, 7:
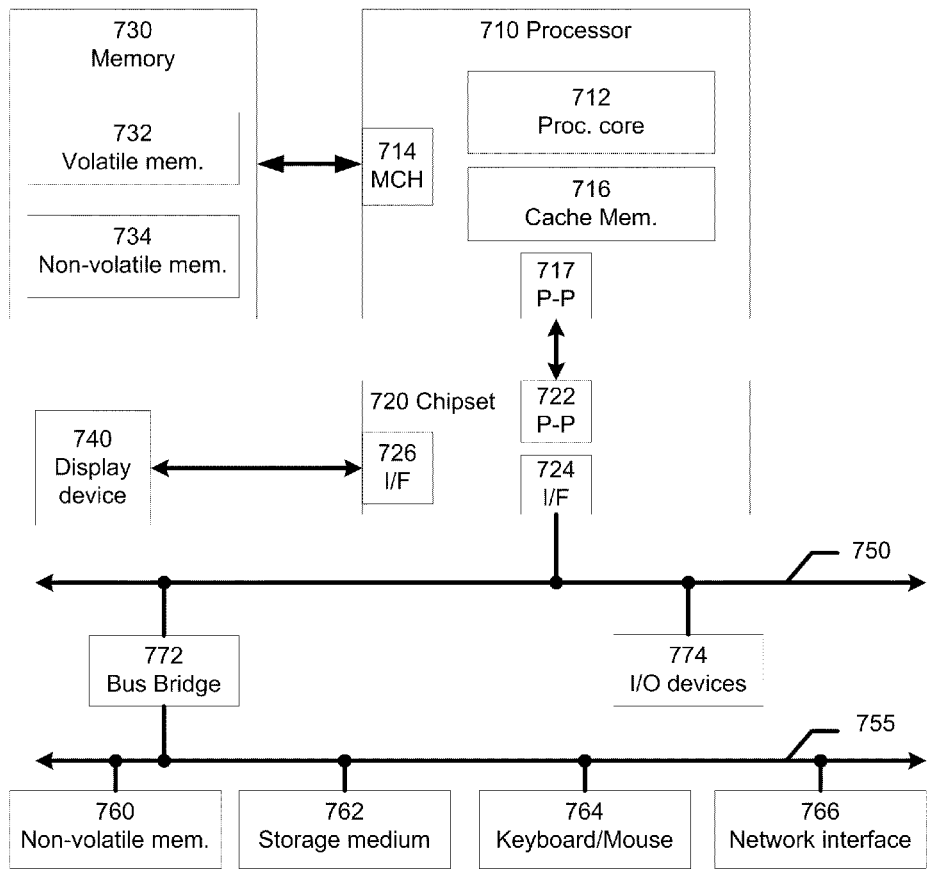
FIG. 5 illustrates a timing diagram of a lazy out-of-order scheduler in accordance with one embodiment of the invention.
FIG. 7 illustrates a system to implement the methods disclosed herein in accordance with one embodiment of the invention.

FIG. 5 illustrates a timing diagram 500 of a lazy OOO scheduler 405 in accordance with one embodiment of the invention. For clarity of illustration, FIG. 5 is discussed together with FIGS. 2 and 4. In cycle 1, the instruction 1 210 is dispatched for execution as it is the first instruction. The instruction 1 210 is assumed to take three cycles to complete execution. The instructions 2-5 220, 230, 240, and 250 are assumed to take one cycle to complete execution.

In cycle 1, the instruction 3 230 is identified as an independent operation by the compare logic 120 and the ready logic 130 marks it as ready during scheduling (SCH). In cycle 2, the pick logic 140 selects the instruction 3 230 for execution stage 1 (EX1) as it is ready to be executed in parallel with the instruction 1 210. The selection signal 425 is set to select from the pick logic 140 as there is a ready instruction.

In cycle 3, the instruction 3 230 is completed and the compare logic 120 and the ready logic 130 marks instruction 4 240 as ready during the scheduling (SCH). In cycle 4, the pick logic 140 selects instruction 3 230 for execution stage 1 (EX1). In cycle 5, the instruction 4 240 is completed and the compare logic 120 and the ready logic 130 marks instruction 5 250 as ready during scheduling (SCH). In cycle 6, the pick logic 140 selects instruction 5 250 for execution stage 1 (EX1).

The lazy OOO scheduler 405 requires six cycles to complete the execution of the sequence 200 of the prior art operations. Compared to the prior art OOO scheduler 105, the lazy OOO scheduler 405 requires one additional cycle. Although the performance of the lazy OOO scheduler 405 is similar to the prior art OOO scheduler 105, the lazy OOO scheduler 405 does not have the time constraints as the prior art OOO scheduler 105. The lazy OOO scheduler 405 gets most of the performance benefits but without the timing pressure of the prior art OOO scheduler 105. The lazy OO scheduler 405 is able to sustain maximum throughput on the oldest operations, and therefore on most streaming execution workloads, but without the need of a single cycle of scheduler loop.

Figure 6:
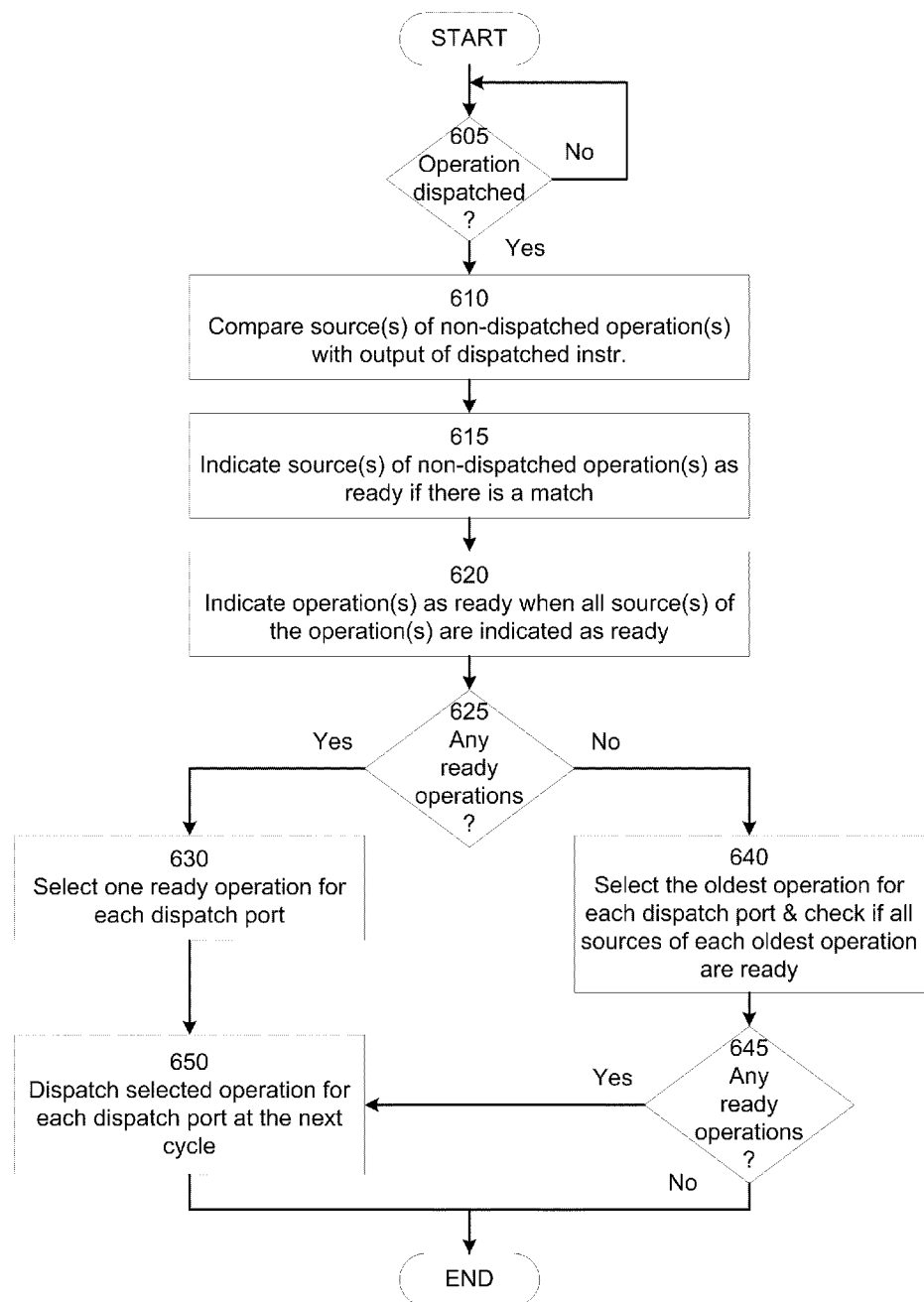
FIG. 6 illustrates a flowchart of the workings of a lazy out-of-order scheduler in accordance with one embodiment of the invention.

FIG. 6 illustrates a flowchart 600 of the workings of a lazy OOO scheduler 405 in accordance with one embodiment of the invention. In step 605, the lazy OOO scheduler 405 checks if an operation has been dispatched. If no, the flow 600 goes back to step 605. If yes, the flow 600 goes to step 610 to compare the source(s) of the non-dispatched operations with the output destination of the dispatched instruction.

In step 615, the lazy OOO scheduler 405 indicate the source(s) of the non-dispatched operations as ready if there is a match with the output destination of the dispatched instruction. In step 620, the lazy OOO scheduler 405 indicate the non-dispatched operation(s) as ready if all the source(s) of the non-dispatched operation(s) have been indicated as ready in step 615.

The steps 610, 615, and 620 are performed within a particular cycle. The steps 625, 630, 640, 645 and 650 are performed in the first subsequent cycle to the particular cycle. In step 625, the lazy OOO scheduler 405 checks if there are any ready instructions. If yes, the lazy OOO scheduler 405 selects one ready operation for each dispatch port in step 630. In step 650, the lazy OOO scheduler 405 dispatches the selected operation(s) for each dispatch port for execution at the next cycle, i.e., the second subsequent cycle to the particular cycle and the flow 600 ends.

If there are no ready instructions in step 625, the lazy OOO scheduler 405 selects the oldest operation for each dispatch port and checks if all the source(s) of each oldest operation are ready in step 640. In step 645, the lazy OOO scheduler 405 checks if the oldest operation(s) are ready. If yes, the flow 600 goes to step 650. If no, the flow 600 ends.

FIG. 7 illustrates a system 700 to implement the methods disclosed herein in accordance with one embodiment of the invention. The system 700 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 700 used to implement the methods disclosed herein may be a system on a chip (SOC) system.

The processor 710 has a processing core 712 to execute instructions of the system 700. The processing core 712 includes, but is not limited to, pre-fetch logic to fetch instructions, decode logic to decode the instructions, execution logic to execute instructions and the like. The processor 710 has a cache memory 716 to cache instructions and/or data of the system 700. In another embodiment of the invention, the cache memory 716 includes, but is not limited to, level one, level two and level three, cache memory or any other configuration of the cache memory within the processor 710. The processor has an embedded lazy OOO scheduler 405 in one embodiment of the invention.

The memory control hub (MCH) 714 performs functions that enable the processor 710 to access and communicate with a memory 730 that includes a volatile memory 732 and/or a non-volatile memory 734. The volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 734 includes, but is not limited to, NAND flash memory, phase change memory (PCM), read only memory (ROM), electrically erasable programmable read only memory (EEPROM), or any other type of non-volatile memory device.

The memory 730 stores information and instructions to be executed by the processor 710. The memory 730 may also stores temporary variables or other intermediate information while the processor 710 is executing instructions. The chipset 720 connects with the processor 710 via Point-to-Point (PtP) interfaces 717 and 722. The chipset 720 enables the processor 710 to connect to other modules in the system 700. In one embodiment of the invention, the interfaces 717 and 722 operate in accordance with a PtP communication protocol such as the Intel® QuickPath Interconnect (QPI) or the like. The chipset 720 connects to a display device 740 that includes, but is not limited to, liquid crystal display (LCD), cathode ray tube (CRT) display, or any other form of visual display device.

In addition, the chipset 720 connects to one or more buses 750 and 755 that interconnect the various modules 774, 760, 762, 764, and 766. Buses 750 and 755 may be interconnected together via a bus bridge 772 if there is a mismatch in bus speed or communication protocol. The chipset 720 couples with, but is not limited to, a non-volatile memory 760, a mass storage device(s) 762, a keyboard/mouse 764 and a network interface 766. The mass storage device 762 includes, but is not limited to, a solid state drive, a hard disk drive, an universal serial bus flash memory drive, or any other form of computer data storage medium. The network interface 766 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 7 are depicted as separate blocks within the system 700, the functions performed by some of these blocks may be integrated within a single semiconductor circuit or may be implemented using two or more separate integrated circuits. For example, although the cache memory 716 is depicted as a separate block within the processor 710, the cache memory 716 can be incorporated into the processor core 712 respectively. The system 700 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A processor comprising:
   logic to:
      determine in a first cycle, whether one or more operations are ready to be executed, wherein each of the one or more operations has a time stamp;
      determine in the first cycle, whether each of one or more input sources of each operation is to match an output destination of the one or more operations ready to be executed;
      in response to the determination that the one or more operations are ready to be executed, select in a second cycle, one of the one or more operations ready to be executed in a third cycle, wherein the first cycle, the second cycle and the third cycle are sequential time clock cycles; and
      in response to the determination that none of the one or more operations are ready to be executed,
         select in the second cycle, an operation with the oldest time stamp;
         determine in the second cycle, whether the selected operation with the oldest time stamp is ready to be executed; and
         dispatch the selected operation with the oldest time stamp for execution in the third cycle responsive to the determination that the selected operation with the oldest time stamp is ready to be executed.

2. The processor of claim 1, wherein the logic is further to dispatch the selected one operation for execution in the third cycle.

3. A processor comprising:
   an out-of-order scheduler to:
      split each scheduling loop into two consecutive clock cycles, wherein the scheduling loop comprises a compare stage, a ready stage and a pick stage and wherein the compare stage and the ready stage are to be executed in a first of the two consecutive clock cycles and the pick stage is to be executed in a second of the two consecutive clock cycles; and
      receive one or more operations, wherein each of the one or more operations has a time stamp, and wherein the out-of-order scheduler is further to:
         select an operation with an oldest time stamp responsive to a determination that none of the one or more operations are indicated as ready;
         determine whether the selected operation with the oldest time stamp is ready to be executed during the pick stage; and
         determine whether each of one or more input sources of each operation is to match an output destination of a dispatched operation during the compare stage.

4. The processor of claim 3, wherein the out-of-order scheduler is further to:
   indicate, during the ready stage, each of the one or more input sources of each operation as ready in response to a determination that each of the one or more input sources of each operation is to match the output destination of the dispatched operation; and
   indicate, during the ready stage, each operation as ready in response to a determination that all of the one or more input sources of each operation are to be indicated as ready during the ready stage.

5. The processor of claim 4, wherein the out-of-order scheduler is further to select one of the one or more operations indicated as ready during the pick stage.

6. The processor of claim 5, wherein the out-of-order scheduler to select one of the one or more operations indicated as ready during the pick stage is to select one of the one or more operations indicated as ready during the pick stage based on a resource requirement or a timing requirement.

7. The processor of claim 4, wherein the out-of-order scheduler is further to dispatch the selected operation with the oldest time stamp for execution responsive to a determination that the selected operation with the oldest time stamp is ready to be executed.

8. A method comprising:
   determining, in a first cycle immediately preceding a second cycle, whether one or more input sources of each operation is to match an output destination of a dispatched operation;
   indicating, in the first cycle immediately preceding the second cycle, the one or more input sources of each operation as ready in response to the determination that the one or more input sources of each operation is to match the output destination of the dispatched operation;
   selecting, in the second cycle, one of a plurality of operations responsive to a determination that none of the plurality of operations are ready to be executed, wherein each operation has a time stamp, and wherein the selected one operation has an oldest time stamp;
   updating, in the second cycle, readiness of the selected one operation based on current input source information; and
   determining, in the second cycle, whether the selected one operation is ready to be executed in an immediate subsequent cycle to the second cycle in response to the updating of the readiness of the selected one operation.

9. The method of claim 8, further comprising:
   indicating, in the cycle immediately preceding the first cycle, each operation as ready in response to a determination that all input sources of each operation is indicated as ready.

10. The method of claim 8, further comprising:
    dispatching the selected one operation for execution in the immediate subsequent cycle to the first cycle.

* * * * *